(12) United States Patent
Rantala

(10) Patent No.: US 8,326,391 B2
(45) Date of Patent: Dec. 4, 2012

(54) SENSOR INTERFACE

(75) Inventor: Borje Rantala, Helsinki (FI)

(73) Assignee: General Electric Company, Schenectady, NY (US)

( * ) Notice: Subject to any disclaimer, the term of this patent is extended or adjusted under 35 U.S.C. 154(b) by 1302 days.

(21) Appl. No.: 12/047,059

(22) Filed: Mar. 12, 2008

(65) Prior Publication Data
US 2009/0234207 A1    Sep. 17, 2009

(51) Int. Cl.
A61B 5/1455    (2006.01)
(52) U.S. Cl. ......................... 600/323; 600/310
(58) Field of Classification Search .......... 600/310, 600/322, 323; 439/909
See application file for complete search history.

(56) References Cited

U.S. PATENT DOCUMENTS

| | | | |
|---|---|---|---|
| 4,356,475 A * | 10/1982 | Neumann et al. | 600/522 |
| 5,623,925 A * | 4/1997 | Swenson et al. | 600/301 |
| 5,995,855 A * | 11/1999 | Kiani et al. | 600/310 |
| 6,243,654 B1 | 6/2001 | Johnson et al. | |
| 6,993,371 B2 | 1/2006 | Kiani et al. | |
| 7,031,865 B2 | 4/2006 | Bathurst et al. | |
| 2005/0075548 A1* | 4/2005 | Al-Ali et al. | 600/322 |

OTHER PUBLICATIONS

"Smart Sensor Interface for Industrial Applications" retrieved from URL: http://www.industrial-embedded.com/articles/alleven/.
"Connector Interface Modules Technical Information" retrieved from URL: http://www.analoginterfaces.com/uploads/CIMpdfnote-68.pdf.

* cited by examiner

*Primary Examiner* — Eric Winakur
(74) *Attorney, Agent, or Firm* — Andrus, Sceales, Starke & Sawall, LLP (57) ABSTRACT

A sensor interface configured to adapt analog and digital sensors is disclosed herein. The sensor interface unit includes: a port configured to be coupled to either a digital sensor or an analog sensor and a signal processing circuit for processing an analog sensor output when an analog sensor is coupled to the port. The interface further includes a switching mechanism configured to bypass the signal processing circuitry when a digital sensor is coupled to the port.

13 Claims, 7 Drawing Sheets

SENSOR INTERFACE

FIELD OF THE INVENTION

This invention relates generally to connectors, and more particularly to, a sensor interface configured to adapt digital sensors and analog sensors.

BACKGROUND OF THE INVENTION

Today varieties of sensors are available including analog and digital sensors. Different kinds of sensors or transducers are used in various applications and for many different uses. The sensor output signals need to be appropriately processed to determine relevant information. For example, the sensor output signals often need to be amplified before processing the same. Generally, the sensor output signals are processed using external devices.

However smart sensors or digital sensors are available with signal processing electronics associated with the sensors themselves. In this case, there is no external signal processing electronics required to process the sensor output. In an example, the signal processing electronics is located within the cable associated with the sensor.

The analog sensors are often simple and economical, but they need external electronics to process the sensor output. Generally the signal processing electronics is associated with device to which the sensors are being connected. As the signal processing electronics is associated with an external device, the connection is rigid and any change in the nature of the sensor or requirement to adapt more sensors is not feasible and it becomes necessary to alter the configuration of the external device. Whereas digital sensors do not need any separate signal processing electronics for processing the sensor output signals. While using an alternate sensor or using additional sensors, the digital sensor interfacing unit or the device to which the sensors are connected does not require any alteration in their configuration. However the digital sensors are expensive and are bulkier. Hence it will be beneficial to design a mechanism that could combine the advantages of both analog and digital sensors and, based on the particular application, a user may then use either analog or digital sensors.

Thus there exists a need to provide a sensor interface capable of adapting digital and analog sensors.

SUMMARY OF THE INVENTION

The above-mentioned shortcomings, disadvantages and problems are addressed herein which will be understood by reading and understanding the following specification.

In one embodiment, the present invention provides a sensor interface unit. The sensor interface unit includes: a port configured to be coupled to either a digital sensor or an analog sensor; a signal processing circuit for processing an analog sensor output when an analog sensor is coupled to the port; and a switching mechanism configured to bypass the signal processing circuit when a digital sensor is coupled to the port.

In yet another embodiment, a detection system is disclosed. The detection system includes: a sensor assembly having digital sensors and analog sensors; and an interface unit configured to connect the sensor assembly to a processor; wherein the processor is configured to detect the nature of the sensors and select desired signal processing electronics based on the nature of the sensors.

In yet another embodiment, the invention provides a signal detection method. The method includes: configuring a port to adapt a detecting element including either an analog sensor or a digital sensor; identifying the nature of the detecting element; and selecting signal processing electronics based on the nature of the detecting element.

In yet another embodiment, a patient monitor is disclosed. The patient monitor includes: a plurality of detecting elements configured to include analog sensors and digital sensors; a connector having multiple ports configured to adapt the detecting elements; a processor configured to process the outputs of the detecting elements in accordance with the nature of the detecting elements; and a display configured to display the processed signals.

In another embodiment a pulse oximeter system is disclosed. The system includes: a probe having emitters for emitting radiations at a minimum of two different wavelengths and a photodiode detector configured to receive radiation; a connector having a plurality of ports, configured to adapt the emitters and the photodiode detector including analog and digital sensors; and a switching mechanism configured to select a desired signal processing electronics based on the nature of the sensors connected.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

In various embodiments, a sensor interface unit is disclosed. The sensor interface unit is configured to be coupled to analog and digital sensors and is configured to select desired signal processing electronics based on the nature of the sensor.

In an exemplary embodiment, the invention provides a pulse oximeter configured to adapt simple as well as digital SpO2 (saturation of peripheral oxygen) sensors.

In an embodiment, the invention discloses a detection system that is attachable to a device operated based on input from the detection system. The detection system is configured to accept analog and digital signals, but the output of the detection system is digital signal, which is fed to the device and the device is operated accordingly.

In another embodiment, a multi-sensor adaptor is provided. The adaptor includes: at least one analog port configured to accept analog sensors; and at least one digital port configured to accept digital sensors; wherein the digital port and the analog port function mutually exclusive.

The term "interface unit" indicates any mechanism through which at least one sensor is connected to a device. The term "interface unit" is synonymous with connectors, connecting pins, connecting ports, interfacing module etc. The term "sensor" can include various available sensors and is synonymous with transducers, detectors, detecting elements etc.

Even though the invention is explained with reference to patient monitors, the application of the invention need not be limited to this. The invention could be applied to any device wherein there is a need to connect digital and analog sensors. Rather an application where the user is not aware of the nature or the technology of the sensor. Thus the invention facilitates easy adaptation of multiple sensors to a device.

Figure 1:
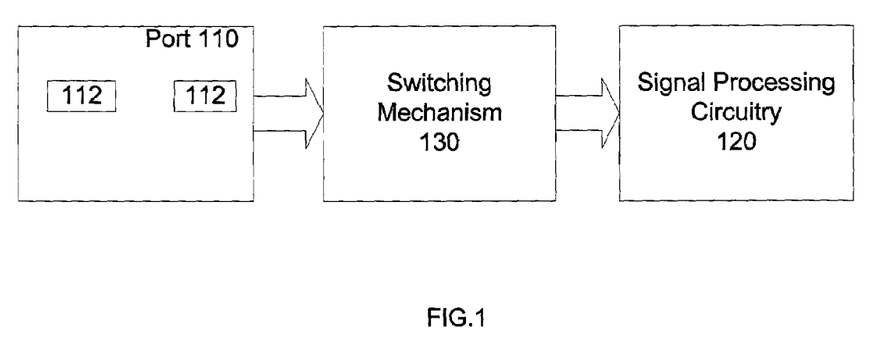
FIG. 1 is a block diagram of a sensor interface unit as described in an embodiment of the invention.

FIG. 1 is a block diagram of a sensor interface unit as described in an embodiment of the invention. The sensor interface unit is attachable to any device. The sensor interface unit is configured to connect plurality of sensors to any device. The sensor interface unit, hereinafter referred as a unit includes at least one port 110 configured to be coupled to either analog or digital sensor. Analog sensors have analog output and they need external signal processing electronics to process the sensor output, hence no need of external signal processing electronics. The digital sensors have the signal processing electronics associated with the sensor itself. In an embodiment the ports 110 may include connecting pins or connecting points 112 that are configured to accept analog and digital sensors. The functionality of these pins 112 may be multiplexed based on the need. The unit further comprises a signal processing circuitry 120 for processing output signal from an analog sensor. The signal processing circuitry 120 may include signal conditioners and/or signal amplifiers. In an example, the output of the analog sensor, which is an analog signal is amplified, signal conditioned and is converted to a digital data. The signal processing circuit 120 is further associated with a switching mechanism 130. The switching mechanism 130 controls the operation of the signal processing circuit 120. Since the digital sensors have signal processing electronics associated with the sensor itself there is no need to process the signal again. Hence in the event of digital sensor being associated with the port 110, the switching mechanism 130 bypasses the signal processing circuit 120. If an analog sensor is connected to the port 110, the output of the analog signal needs to be processed and have to be connected to the signal processing circuit 120. In an embodiment, the switching mechanism 130 is configured to identity the nature of the sensor connected to the port 110 and selects the signal processing circuit 120 accordingly. The nature of the sensor may be identified using the nature of the sensor output signal such as current or voltage signal or based on the signal levels. The signal processing circuit 120 may also be associated with some safety mechanism that take care of the power, calibration or any other incompatibilities, while the port 110 being connected with a digital sensor and/or analog sensor. In an embodiment, the switching mechanism is an analog switching mechanism, for example, a low leakage analog switch.

Figure 2:
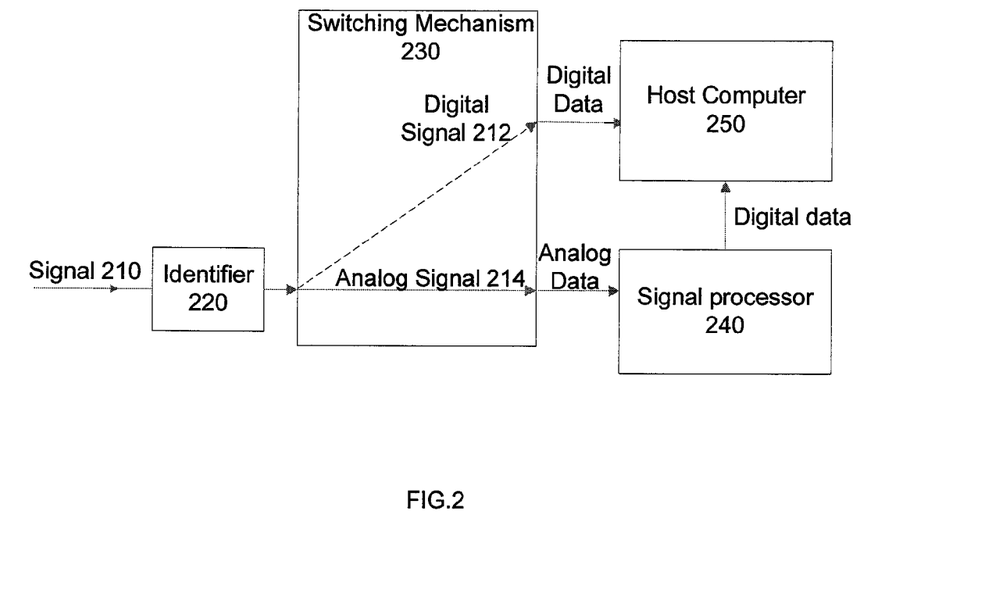
FIG. 2 is a diagrammatic representation of a sensor interface unit as described in an embodiment of the invention.

FIG. 2 is a diagrammatic representation of a sensor interface unit as described in an embodiment of the invention. An identifier 220 identifies a signal 210, which could be an analog signal or digital signal. The output of the identifier 220 is fed to a switching mechanism 230. Based on the output of the identifier 220, the switching mechanism 230 selects relevant processing techniques for the analog or digital signal. If the identifier 220 identifies the signal 210 as a digital signal 212, the signal 210 is directly fed to a host computer 250. The digital signal 212 is a digital data and the same can be fed directly to the host computer 250. If the signal 210 is identified as an analog signal 214, the signal 214 needs to be processed using a signal processor 240. The processed signal, which is a digital data, is fed to the host computer 250. In an embodiment, the output of identifier 220 may be used in triggering different safety mechanisms.

Figure 3:
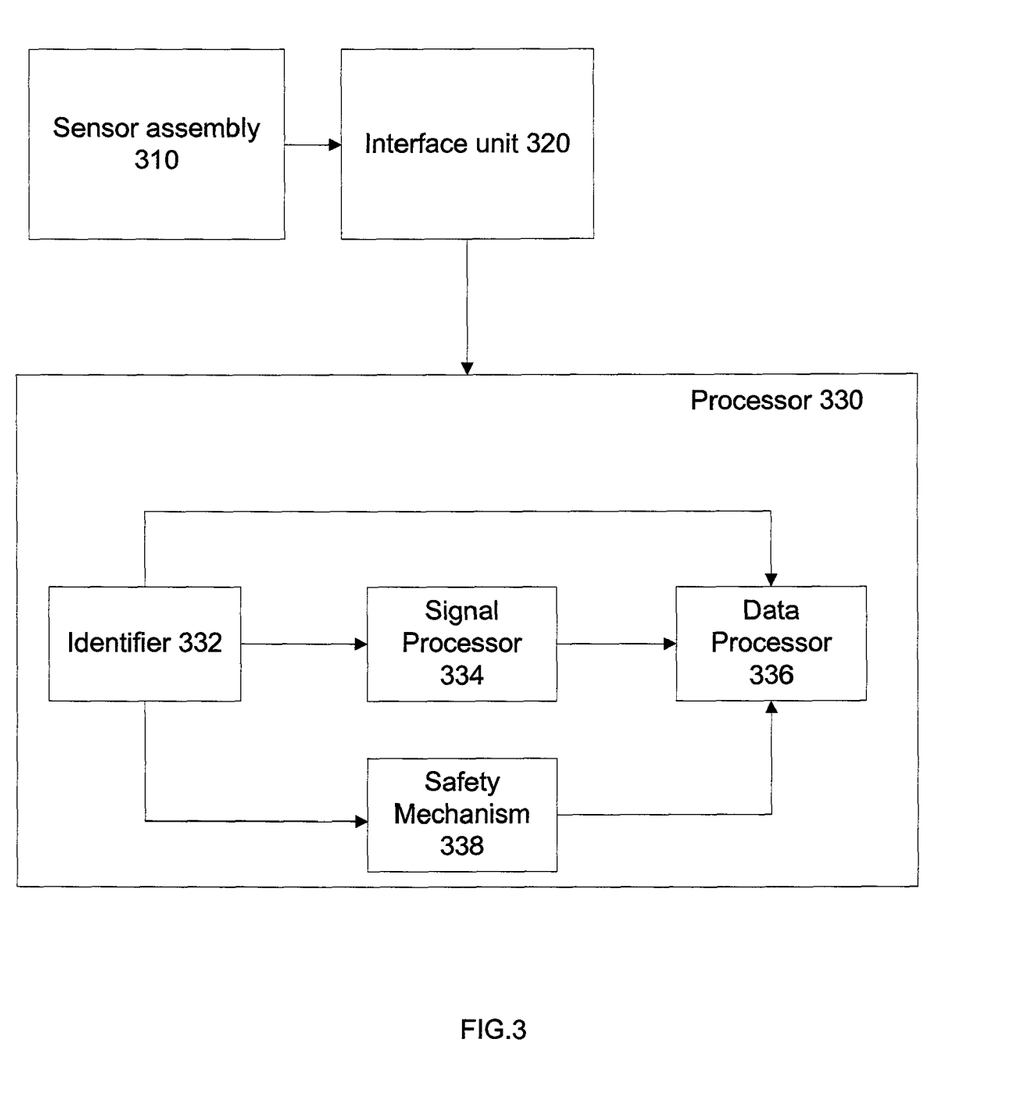
FIG. 3 a block diagram of a detection system as described in an embodiment of the invention.

FIG. 3 is a block diagram of a detection system as described in an embodiment of the invention. The detection system is configured to identify one or more signal inputs. The detection system hereinafter referred as a system includes a sensor assembly 310. The sensor assembly 310 comprises plurality of sensors including analog sensors and digital sensors. The sensor assembly 310 is connected to a processor 330 through an interface unit 320. The interface unit 320 includes connectors, port, connecting pins, interfacing modules etc, but need not be limited to these. The interface unit 320 is configured to connect the sensor assembly 310 to the processor 330. In an embodiment, the interface unit 320 is configured to adapt digital sensors and analog sensors. The interface unit 320 may have separate ports for digital sensors and for analog sensors. Alternately a set of ports may be multiplexed for adapting digital sensors and analog sensors. In case where same ports are being used by analog and digital sensors, there exists a need to provide compatibility for using various sensors. This may include providing power compatibility, calibration requirement etc. The sensor assembly 310 is connected to the processor 330 through the interface unit 320. The processor 330 includes an identifier 332 configured to identify the nature of the sensor in the sensor assembly 310. The identifier 332 selects the desired processing techniques based on the nature of the signal received from the interface unit 320. The identifier 332 may act as a switch configured to select between the desired processing techniques for analog and digital sensors. The output of the analog sensor is an analog signal and that of the digital sensor is a digital signal and in an example, based on the same the identifier 332 identifies the nature of the sensor.

In the event of an analog sensor, the identifier 332 passes the output of the sensor received through the interface unit 320 to a signal processor 334. The signal processor 334 is required to process the analog signal. The signal processor 334 may include preamplifiers, signal conditioners, analog to digital converters etc. The configuration of the signal processor 334 may vary based on the application. The output of the signal processor 334, a digital signal, is fed to a data processor 336 in the processor 330. The data processor 336 is configured to process the output of the sensors in the sensor assembly 310. In an example, the data processor 336 infers relevant information from the signal received from the sensing assembly 310.

In the event of a digital sensor, the identifier 332 identifies the signal as a digital signal and hence there is no need to perform signal processing. Here the identifier 332 is configured to bypass the signal processor 334 and the digital signal is directly fed to the data processor 336.

Thus the data processor 336 receives the output of the sensors and processes the signal. The data processor 336 receives the signal in the uniform format and hence same processing techniques may be used in processing the signals received from the analog sensor and digital sensor.

While the system is configured to adapt digital sensors and analog sensors, using same ports, a safety mechanism 338 is provided for ensuring safety of the sensors and the user. The driving power requirement, calibration requirement for analog sensors etc may be taken care by the safety mechanism 338. The safety mechanism 338 is triggered by the identifier 332 based on the nature of the sensors connected in the sensor assembly 310.

Figure 4:
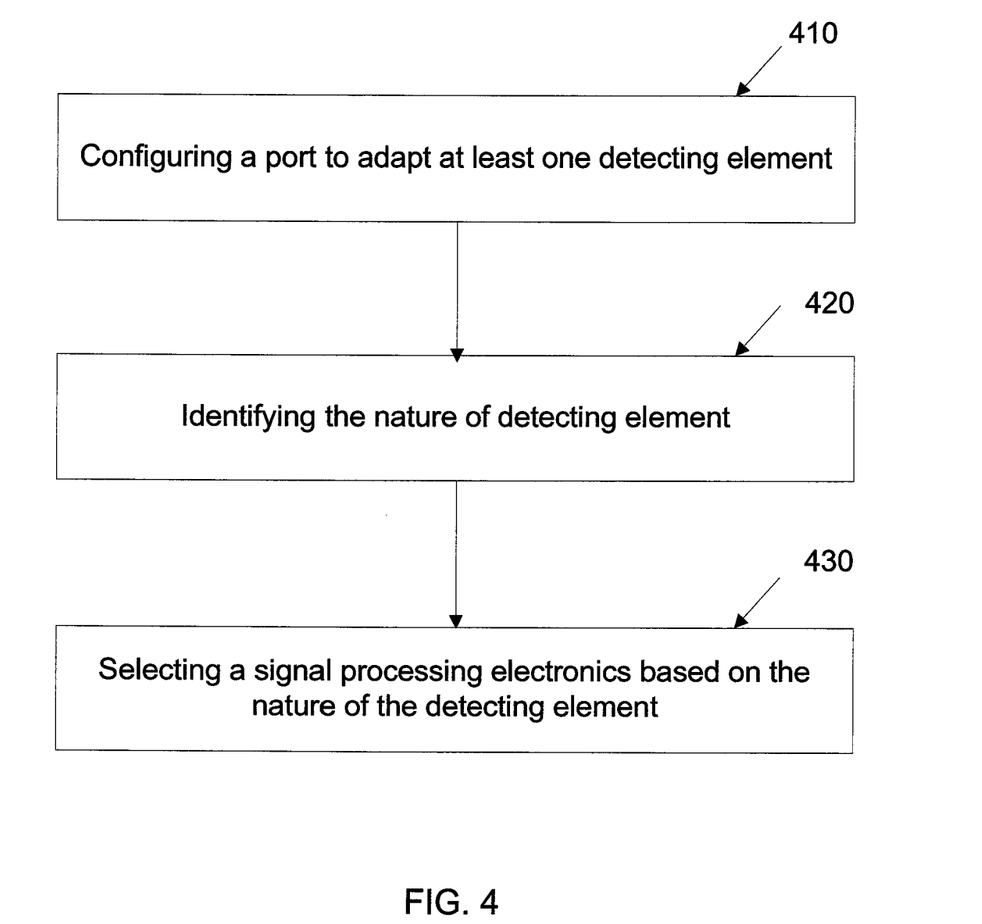
FIG. 4 is a flowchart illustrating a signal detection method as described in an embodiment of the invention.

FIG. 4 is a flowchart illustrating signal detection method as described in an embodiment of the invention. At step 410, a connector or an interface is configured to adapt at least one detecting element. The detecting element may include analog sensors and digital sensors. This could be achieved by multiplexing one or more ports in the connector. At step 420, the nature of the sensor is identified. This could be achieved by identifying the type of the signal based on current or voltage signal, based on their levels etc. At step 430, a signal processing electronics is selected based on the nature of the sensor. If the detecting element is an analog sensor, a signal processor including signal conditioners and amplifiers is selected. In case of digital sensors, the signal processing electronics is bypassed.

Figure 5:
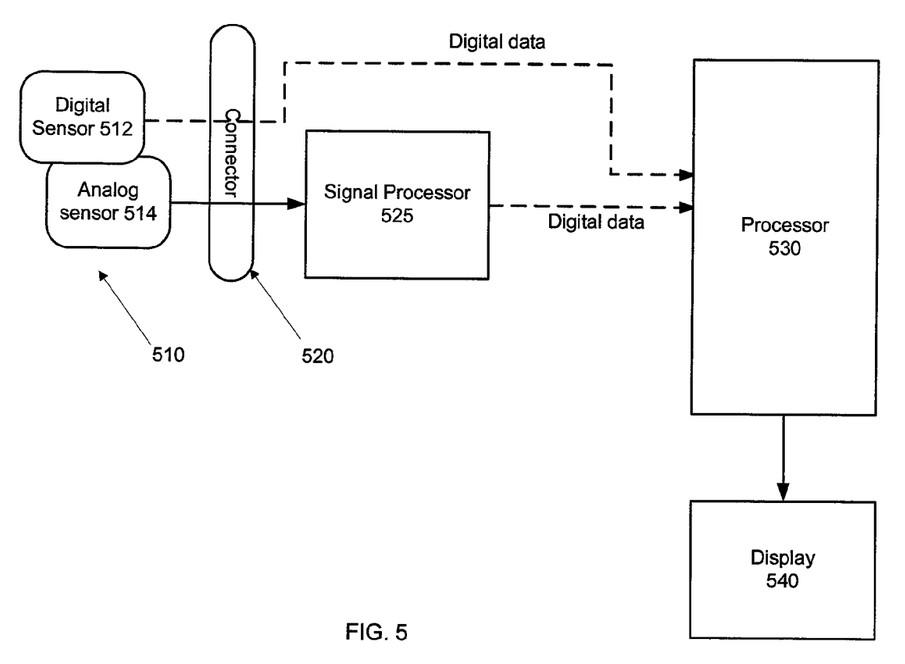
FIG. 5 is a block diagram of a patient monitor as described in an embodiment of the invention.

FIG. 5 is a block diagram of patient monitor as described in an embodiment of the invention. The patient monitor is configured to monitor various patient statuses of different patients. The patient monitor includes a plurality of detecting elements 510 connected to a processor 530 through a connector 520. The detecting elements 510 include digital sensors 512 and analog sensors 514. In an example, the analog sensor may be a pressure bridge sensor or a basic pulse oximeter sensor. The analog sensor 514 requires external signal processing electronics to process its output. In an example, digital sensor 512 may be a multiwavelength sensor configured to detect hemoglobin derivatives along with the patient's oxygen levels in blood. The digital or smart sensors 512 do not require any external signal processing electronics to process the sensor output. The detecting elements 510 are connected to the processor 530 through the connecter 520. The connecter 520 has a plurality of connecting ports configured to accept the digital sensors 512 and analog sensors 514. The ports in the connector are multiplexed to accommodate variety of sensors. The analog sensor 514 is connected to the processor 530 through a signal processor 525. The signal processor 525, before feeding it to the processor 530, processes the analog signal. The digital sensor 512 can be directly provided to the processor 530. The patient monitor is provided with a display 540, configured to display the sensor output processed by the processor 530.

Figure 6:
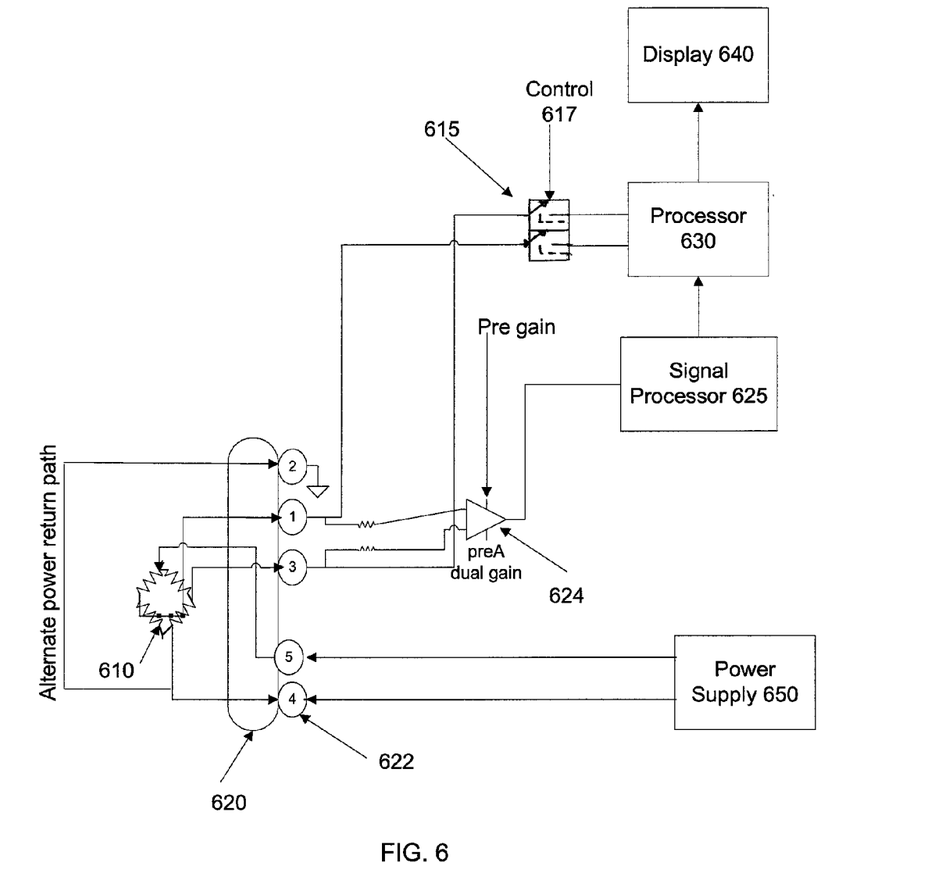
FIG. 6 is a exemplary embodiment of a patient monitor described with reference to FIG. 5.

FIG. 6 depicts an exemplary embodiment of a patient monitor described with reference to FIG. 5. The patient monitor comprises a sensor 610, a connector 620 having plurality of ports 622, processor 630 and a display 640 as described in FIG. 5. In an example shown a bridge type pressure sensor is connected to a port. In example, the pressure sensor is an analog sensor. The connector 620 has plurality ports 622. The connector 620 is shown with five ports. The analog sensor, in an example, the bridge type pressure sensor, is connected to the ports 1 and 3 of the connector 620. Since the analog sensor requires high voltage and low voltage excitation, it is derived through a power supply 650 connected to ports 5 and 4. For analog sensor 610, the output of the sensor is connected to a preamplifier 624 and is amplified based on a pre-gain. Once the signal is amplified, it is fed to signal processor 625. The signal processor 625 performs the signal conditioning and processing and is then fed to the processor or host computer 630. A switch 615 is provided to bypass the signal processor 625 in the event of a digital sensor. When a digital sensor is connected, the switch 615 will be in closed position and the sensor 610 will be connected directly to the host computer or the processor 630. For analog sensor, the switch 615 will be in open position and hence the output of the sensor is fed to the signal processor 625 through the preamplifier 624. The function of the switch 615 may be controlled by a control 617. The control 617 may be derived based on the nature of the sensor 610. However driving power requirement for digital sensor varies from that of the analog sensor. While digital sensors are being connected, the port 4 and 5 are multiplexed together to provided positive power supply to the digital sensors.

Figure 7:
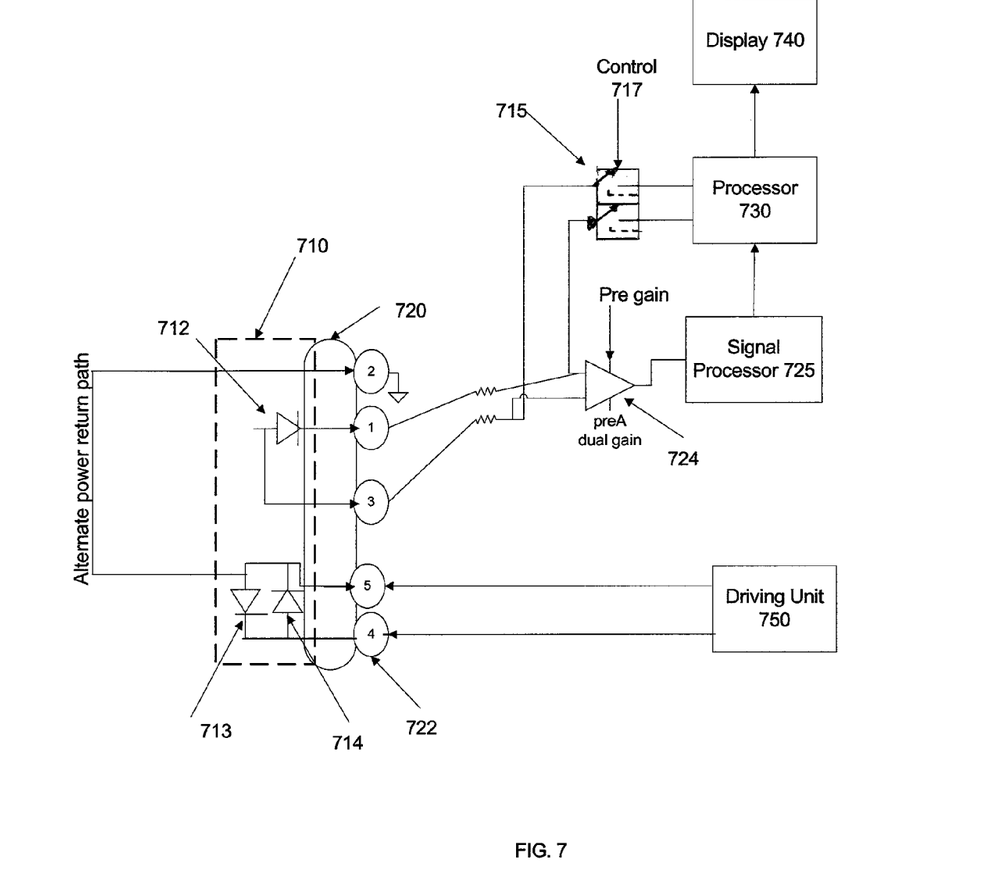
FIG. 7 depicts a pulse oximetry system as described in an embodiment of the invention.

FIG. 7 depicts a pulse oximetry system as described in an embodiment of the invention. Pulse oximetry system is used for measuring the oxygen saturation level of arterial blood, an indicator of oxygen supply. A pulse oximetry system comprises a probe 710 attachable to a patient and is connected to a processor 730. The probe 710 may be connected to the processor 730 through a cable (not shown). The probe 710 includes plurality of emitters, emitting radiations at a minimum of two different wavelengths and a photodiode detector 712 for receiving radiations. The photodiode detector 712 includes analog sensors and digital sensors. In an example, the emitters include LED (Light Emitting Diode) emitters including a red LED emitter 713 and an infrared LED emitter 714. The red LED 713 and infrared LED 714 are connected back-to-back and in parallel. The photodiode detector 712, herein after referred as sensor includes analog and/or digital sensors. The analog sensor includes a basic pulse oximetry sensor and the digital sensor includes a multiwavelength sensor configured to detect hemoglobin derivatives. Both analog and digital detectors are configured to detect the saturation level of oxygen in blood. Thus the analog sensor and digital sensor measure essentially the same physiological signal including SpO2 and pulse rate. Alternately the analog sensor and digital sensor may measure different physiological signals. In an example, the analog sensor is invasive pressure sensor and the digital sensor is a generic smart sensor.

The sensor 712 is typically attached to an adult patient's finger or an infant patient's foot. For a finger, the probe 710 is configured such that the emitters 713, 714 project light through the fingernail and into the blood vessels and capillaries underneath. The sensor 712 is positioned at the finger tip opposite the fingernail so as to detect the LED 713, 714 emitted light as it emerges from the finger tissues. The probe 710 includes a connector 720 having plurality of ports 722. The connector 720 is configured to attach the sensors 712 to the patient through the probe 710. In an example, the connector 720 may include a cable as well and may be connected directly to the processor 730. The connector 720 is shown with five ports 722. The connector 720 is configured to adapt and connect digital sensors and analog sensors. In an example, shown, the photodiode detector 712 is connected to the ports 1 and 3 of the connector 720. The driving power for LEDs 713, 714 and photodiode detector 712 is derived through a driving unit 750 connected to ports 5 and 4. The driving unit 750 is configured to supply voltage to the lead of one LED and simultaneously prevent current from flowing through the emitters 713, 714 thereby preventing the emitter from generating radiations. The drive signal includes current pulses of different amplitude. However while using an analog pulse oximetry sensor 712, the drive voltage required for the analog sensor is less compared to a digital sensor. It will be dangerous to connect a 5V supply for example, to the leads of the LEDs. This is avoided by providing separate return paths for power and LED return currents as shown and Port 2 is connected to the ground for shielding. While using analog sensors, the power supply of the LED is multiplexed with that of the digital sensor. Also ports, Port 4 and Port 5, to which the driving unit is connected is multiplexed based the nature of the sensor. For an analog sensor, low voltage and high voltage excitation ports are required. For digital sensor these two ports are multiplexed to get a positive power supply for the digital sensors. In the event of a pressure bridge sensor being used as an analog sensor, the bridge excitation voltage is multiplexed with the positive power supply of digital sensors.

If the sensor 710 is an analog sensor, the output of the sensor 710 is connected to a preamplifier 724 and is amplified based on a preamp gain. Once the signal is amplified, it is fed to signal processor 725. The signal processor 725 performs the signal conditioning and processing and is then fed to the processor or host computer 730. A switching mechanism 715 is provided to bypass the signal processor 725 in the event of a digital sensor. While a digital sensor is being connected, the switching mechanism 715 will be in closed position and the sensor 710 will be connected directly to the host computer or to the processor 730. For analog sensors, the switch 715 will be in open position and the signal is fed to the signal processor 725. The function of the switch 715 may be controlled by a control 717. The control 717 may be derived based on the nature of the sensor 710. However driving power requirement for digital sensor varies from that of the analog sensors. The processed signal from the processor 730 is displayed in a display 740. Patient's oxygen saturation, heart rate and plethysmographic waveform etc may be displayed in the display 740.

In an embodiment, the analog sensor may need calibration element and this could be achieved by a providing a single wire EPROM (Electronic Programmable Read only Memory) and EPROM may be accessed based on voltage levels. For example, if the voltage level is above 4V, which is more than the forward voltage of the LEDs used in oximeter, the EPROM may be accessed.

Some of the advantages of the invention include improving usage and handling of sensors as the users need not have to identify the type of sensors. Further as the sensor interface is configured to incorporate different kind of sensors, there is no need to change the configuration of the device to which sensors are being connected for incorporating additional or varieties of sensors.

Thus various embodiments of the invention describe a sensor interface configured to adapt various sensors including digital and analog sensors.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments are described above in detail. The assemblies and methods are not limited to the specific embodiments described herein, but rather, components of each assembly and/or method may be utilized independently and separately from other components described herein. Further the steps involved in the workflow need not follow the sequence in which there are illustrated in figures and all the steps in the work flow need not be performed necessarily to complete the method.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

I claim:

1. A pulse oximeter system comprising:
 a probe having emitters for emitting radiation at a minimum of two different wavelengths and a photodiode detector configured to receive radiation, the photodiode detector being configured as an analog sensor or a digital sensor;
 a connector having a plurality of ports configured to connect with the emitters and the photodiode detector of the probe;
 signal processing electronics configured to process analog signals; and
 a switching mechanism configured to operate to communicatively connect the probe to the signal processing electronics if the detector is an analog sensor or to bypass the signal processing electronics if the detector is a digital sensor.

2. A pulse oximeter system as claimed in claim 1, further comprising a driving unit configured to provide a drive signal to the emitters through the plurality of ports.

3. A pulse oximeter system as claimed in claim 2, wherein the ports connecting the driving unit to the probe are multiplexed while connecting analog sensors and digital sensors.

4. A pulse oximeter system as claimed in claim 3, wherein the ports configured to act as high voltage excitation and low voltage excitation for analog sensors are multiplexed together to be used as positive supply for the digital sensor.

5. A pulse oximeter system as claimed in claim 1, wherein the emitters include back-to-back connected light emitting diodes (LEDs).

6. A pulse oximeter system as claimed in claim 5, further comprising a LED drive connected to the LEDs, the LED drive multiplexed with a positive supply voltage for the digital sensor.

7. A pulse oximeter system as claimed in claim 1, wherein the analog sensor includes a basic pulse oximetry sensor and the digital sensor includes a multiwavelength sensor configured to detect hemoglobin derivatives.

8. A pulse oximeter system as in claimed claim 7, wherein the probe measures essentially the same physiological signal including SpO2 and pulse rate regardless of whether the photodiode detector is configured as an analog sensor or a digital sensor.

9. A pulse oximeter system as claimed in claim 7, wherein the photodiode detector configured as the analog sensor measures a different physiological signal than the photodiode configured as the and digital sensor.

10. A pulse oximeter system comprising:
 a probe configured to produce a signal representative of an oxygen saturation of a patient;
 a connector configured to accept the probe in a communicative connection;
 a signal processor configured to process analog signals, comprising at least an analog to digital converter;
 a computer processor communicatively connected to the signal processor, the computer process operates to calculate the oxygen saturation of the patient; and
 a switch communicatively connected to the connector, signal processor, and the computer processor, wherein the switch operates to communicatively connect the connector to the computer processor if the signal is a digital signal and the switch operates to communicatively connect the connector to the signal processor if the signal is an analog signal.

11. The pulse oximeter of claim 10, further comprising:
a controller communicatively connected to the connector and to the switch, the controller identifies to the switch whether the signal is an analog signal or a digital signal based upon a nature of the signal.

12. The pulse oximeter of claim 11, wherein the probe comprises emitters for emitting radiations at a minimum of two different wavelengths and at least one photodiode detector configured to receive radiation, the at least one photodiode detector comprising an analog sensor or a digital sensor.

13. The pulse oximeter of claim 11, wherein the switch operates to electrically isolate the signal processor from the connector if the signal is a digital signal.

* * * * *